United States Patent [19]

Kurayoshi et al.

[11] Patent Number: 5,323,869
[45] Date of Patent: Jun. 28, 1994

[54] FRONT FENDER MOUNTING STRUCTURE

[75] Inventors: Yoshiyuki Kurayoshi; Hirofumi Fukunaga, both of Saitama, Japan

[73] Assignee: Honda Giken Kogyo Kabushiki Kaisha, Tokyo, Japan

[21] Appl. No.: 795,906

[22] Filed: Nov. 15, 1991

[30] Foreign Application Priority Data

Dec. 20, 1990 [JP] Japan .................................. 2-404494
Dec. 21, 1990 [JP] Japan .................................. 2-405278
Dec. 28, 1990 [JP] Japan .................................. 2-406195

[51] Int. Cl.$^5$ ............................................. B62K 11/02
[52] U.S. Cl. .................................. 180/219; 280/276; 403/21
[58] Field of Search ......................... 180/219; 280/276; 403/21, 22, 408.1

[56] References Cited

U.S. PATENT DOCUMENTS

| | | | |
|---|---|---|---|
| 2,140,628 | 12/1938 | Hoff | 403/21 |
| 2,213,924 | 9/1940 | Tinnerman | 403/21 |
| 2,921,655 | 1/1960 | McGregor | 403/21 |
| 3,053,357 | 9/1962 | Stanger | 403/21 |
| 3,556,570 | 1/1971 | Cosenza | 403/408.1 X |
| 3,918,599 | 11/1975 | Porter | 403/21 X |
| 3,989,262 | 11/1976 | Bauer | 280/279 |
| 4,458,909 | 7/1984 | Morioka | 180/219 X |
| 4,557,494 | 12/1985 | Elwell | 403/22 |
| 4,687,631 | 8/1987 | Wilson et al. | 403/21 |

FOREIGN PATENT DOCUMENTS

| | | | |
|---|---|---|---|
| 1923669 | 4/1978 | Fed. Rep. of Germany | 403/22 |
| 7803102 | 10/1979 | France | 403/21 |
| 3204384 | 9/1991 | Japan | 180/219 |

Primary Examiner—Margaret A. Focarino
Assistant Examiner—Peter C. English
Attorney, Agent, or Firm—Lyon & Lyon

[57] ABSTRACT

A vehicle assembly having a front fender mounting structure, a rear fender mounting structure, a cowling and fuel tank assembly structure and an engine intake structure. The front fender mounting mechanism includes sides plates associated with the front fender and a bracket installed on a front fork which are fastened together by bolts. The bolts cooperate with nuts which are elastically retained by means of nail pieces extending inwardly from the inside surface of the side plate sections of the front fender. A rear fork cover section of a rear fender and a chain case are fastened together by screws to a boss formed on a rear fork of the vehicle. The rear fender and the rear fork appear as if they are formed in a single body through this mounting. On the upper cowling of the vehicle, bosses are formed which extend inwardly and receive elastic members. A fuel tank includes holes extending downwardly therefrom to receive the bosses and elastic members. The upper cowling is assembled from two halves and during assembly the bosses are positioned with the fuel tank so as to compress the elastic members. A rubber sheet is installed between the engine and the air cleaner of the vehicle and is retained by a stay extending from the vehicle body near the opening of the air inlet duct.

2 Claims, 8 Drawing Sheets

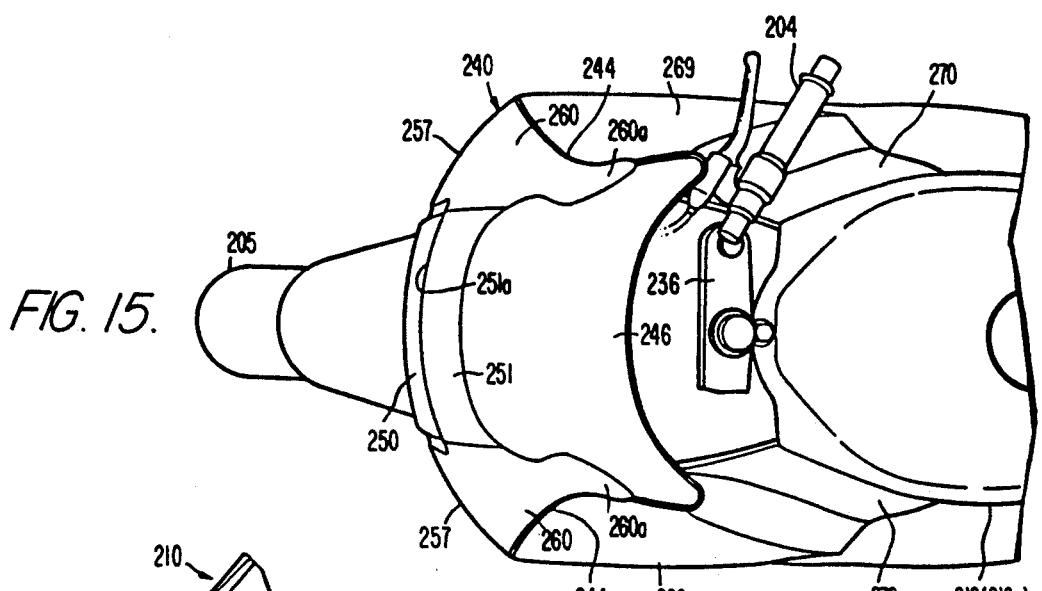
FIG. 15.
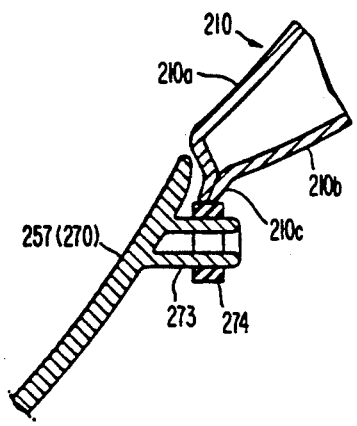
FIG. 16.
FIG. 17.
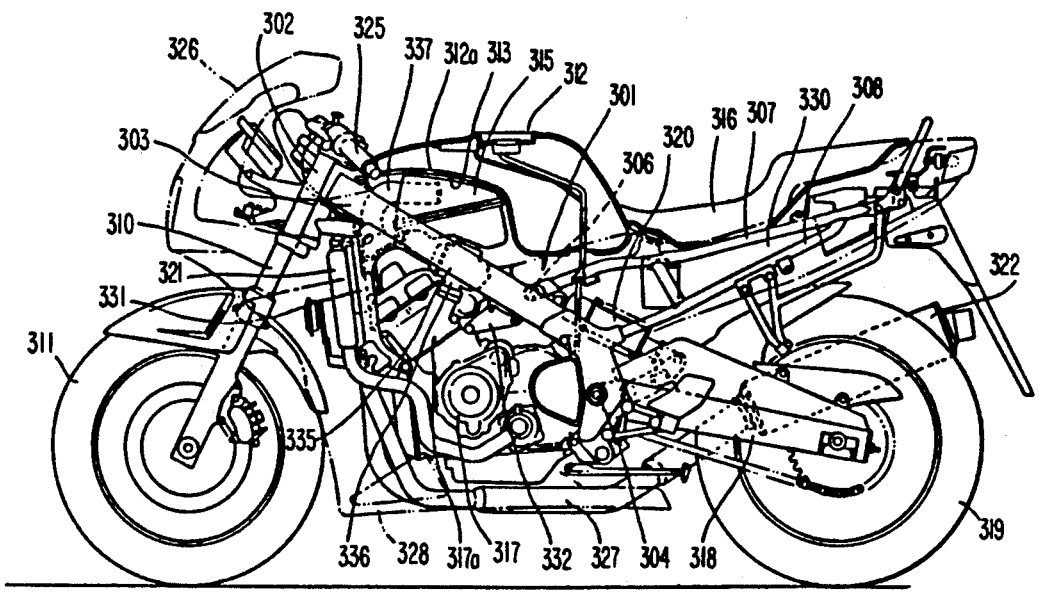

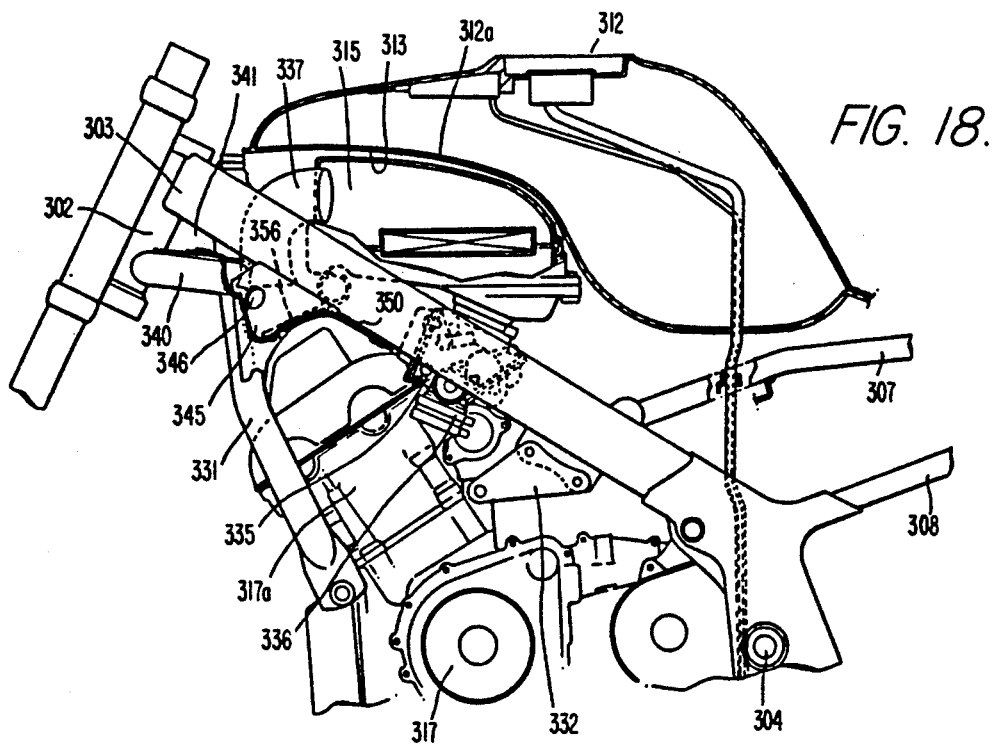
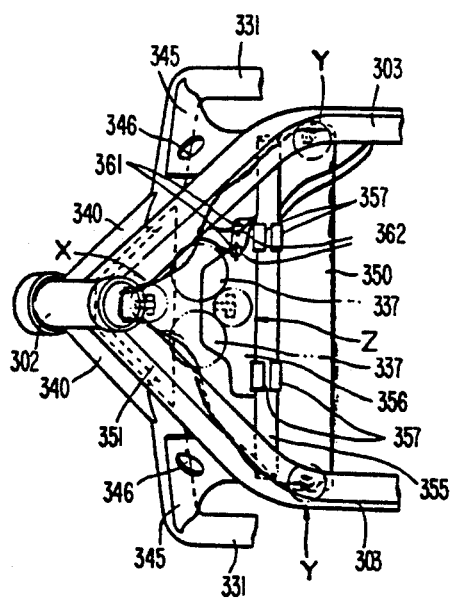
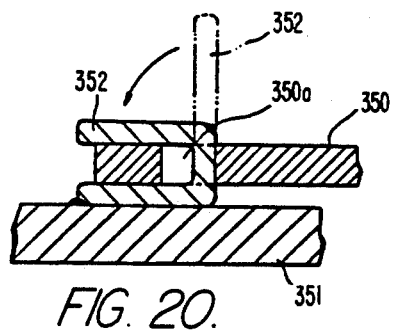
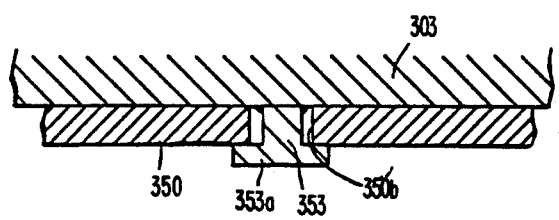
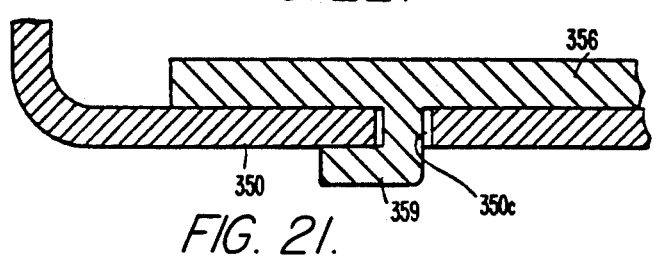

FRONT FENDER MOUNTING STRUCTURE

BACKGROUND OF THE INVENTION

The field of the present invention is assembly features for vehicles such as motorcycles and the like.

Generally the front wheel of a two-wheeled vehicle such as a motorcycle or a scooter is provided with a front fender which covers the upper part thereof for the purpose of preventing mud splashing on the vehicle and rider caused by the rotation of the front wheel.

This type of front fender in conventional use is mounted as shown, for example, in FIGS. 1 and 2. The vehicle has a basic mounting structure with a pair of brackets 2b, front and rear, attached on two outer tubes 2a of a front fork 2 in turn supporting a front wheel 1. Both side plates 3a of a front fender 3 are bolted to the vehicle through the brackets 2b.

The front fender 3 is mounted by mounting a metal support plate 4, which is formed along the contour of the inner surface of the front fender 3, inside of the front fender 3 as shown in FIG. 2. The fender 3 is mounted by attaching the metal support plate 4 with a rivet 5 to the upper part of the front fender 3, by welding a nut member 6 to the inner surface of both the right and left side plates of the metal support plate 4, and further by tightening the flange bolt 7 to be inserted into the mounting hole 2c of the bracket 2b from outside of the vehicle (to the left in FIG. 2) into the member 6.

According to the above-described front fender mounting structure, the metal support plate 4 having the nut member 6 for fastening the flange bolt 7 must be disposed inside of the front fender 3, and, therefore, there remains the following problems to be solved:

Firstly, the installation of the metal support plate 4 to the front fender 3 requires time, resulting in a low operation efficiency.

Secondly, the installation of the metal support plate 4 raises production costs.

Thirdly, it is necessary to make the mounting hole 3a in the upper part of the front fender 3 for mounting the rivet 5 which supports the metal support plate 4, detracting from the appearance of the vehicle.

Rear fender mounting structures for vehicles such as two-wheeled motorcycles have been used to mount rear fenders to motorcycle rear forks such that the feeders may rock together with the rear forks to which they are mounted. In such systems, a rear fork cover section covering at least the upper surface of a rear fork supporting a rear wheel and a fender section covering the upper front part of the rear wheel are typically produced of resin in one body. In mounting the above-described rear fender to the rear fork, there is generally provided a plurality of bosses mating with each other in the mounting positions. These bosses are connected by means of a bolt and nut.

Since the rear fender is formed to appear integral with the rear fork and swings together with the rear fork, the rear fork being produced of aluminum for example, it is sometimes designed to be painted to look like aluminum or in a color close to that of aluminum so that these parts appear as if produced as a single member. However, the need for fasteners positioned visibly reveals that the rear fender is not formed integrally with the rear fork, impairing the appearance of unitary structure.

Common today are full-covered type two-wheeled motorcycles equipped with a cowling mounted to cover almost the whole surface of the vehicle body, from the front to the rear, for wind rectifying and shielding purpose during travel. The cowling of this type is commonly composed of an upper cowl covering the periphery of a handlebar and a headlight at the front of the vehicle body, an under cover covering the side faces of an engine and its peripheral equipment, and a seat cowl extending as far as the rear part of the vehicle body to cover the side lower part of the seat. All these cowls are assembled and mounted on the vehicle body in a streamline form. Of these cowls, the upper cowl has in some cases a curved and continued shape formed along the outside surface of the side of the fuel tank, closing, with the rear top end part thereof, a gap existing between the upper cowl and the front part of the fuel tank.

During travel, the wind coming into the vehicle body from the underside of the upper cowl hits against the inside surface of the part of the upper cowl continued to the fuel tank, raising this part upward. In this case, the use of the fastening means such as bolts may be considered to prevent the rise of the part with the wind. This, however, is disadvantageous because the bolts will be exposed to impair the appearance of the interrupted curved surfaces of the upper cowl and the fuel tank, and moreover time and labor will be required for the assembling of the cowl.

Intake structures have been developed for the purpose of improving the intake efficiency of engines for two-wheeled motorcycles. An intake system passage extending from the engine is inclined higher at the rear than at the front so as to provide as much straight passage as possible. Air cleaners have been connected to such intake system passages and are disposed in a lower recessed section of a fuel tank. Further, air outlet ducts to the air cleaner have been extended forward, opening at the rear of the head pipe.

In the above-described intake structure, the use of a heat shield plate between the air cleaner and the engine has been considered for the purpose of protecting the air cleaner and the air introducing duct from the heat of the engine. Such a heat shield plate, installed in a narrow space enclosed with a main frame above the engine, must be made of a flexible material, for example a rubber sheet, in order to insure easy installation. However, if such a rubber sheet is installed in a position opposite to the air inlet duct, the rubber sheet is likely to become deformed with negative pressure in the engine intake system because of the narrowness of the space.

SUMMARY OF THE INVENTION

The present invention is directed to assembly structures for small vehicle such as motorcycles and the like. The features, inter alia, facilitate vehicle assembly.

In a first aspect of the present invention, a front fender mounting structure is provided which can dispense with the common metal support plate and improve operation efficiency in the installation of the front fender. In addition, because no rivet mounting hole is required, it is possible to manufacture front fenders of simple construction at a low cost. A front fender mounting structure may be provided with both side plates of a front fender fastened to a bracket mounted on a front fork by a fastener inserted from outside of the vehicle. A nut member to be associated with the fastener may also be installed on the inside surface of both the side plate sections of the front fender and elastically retained with nail pieces extending inwardly of the inside surface of the side plate section of the front fender.

With employment of the foregoing feature, the nut member may be elastically retained by the nail pieces of the front fender to the inside surface of the side plate section of the front fender. It is then possible to align a threaded hole of the nut member fully with a fastener mounting hole of the front fender. Therefore, the fastener can easily be screwed into the hole of the nut member by inserting the fastener form outside through the bracket of the front fork and the side plate section of the front fender.

BRIEF DESCRIPTION OF THE DRAWINGS

FIG. 15 is a top view of the front of the motorcycle.

FIG. 16 is a sectional view of the joining portion between the upper cowl and the fuel tank.

FIG. 17 is a side view of a motorcycle showing the body with the fairings removed and shown in phantom, indicating further elements.

FIG. 18 is a cross-sectional side view of the front part of the motorcycle body.

FIG. 19 is a plan view of the front part of the motorcycle body.

FIG. 20 is an enlarged view of the circled portion marked X in FIG. 19.

FIG. 21 is an enlarged view of the circled section marked Y in FIG. 19.

FIG. 22 is an enlarged view of the circled section marked Z in FIG. 19.

DETAILED DESCRIPTION OF THE PREFERRED EMBODIMENTS

Figure 1:
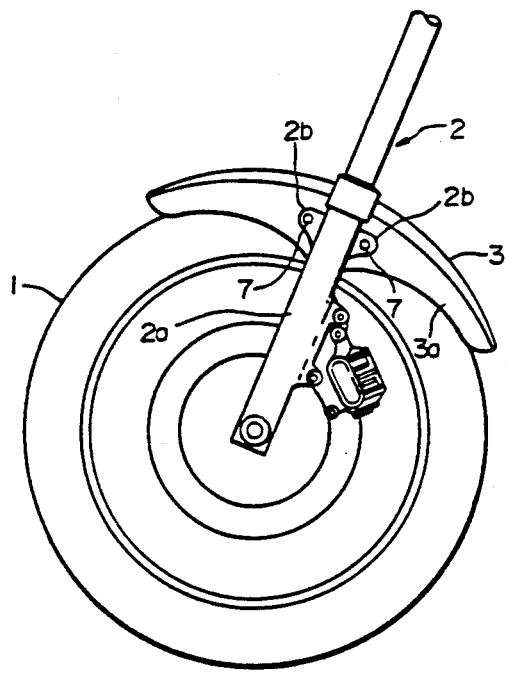
FIG. 1 is a side view showing a conventional front fender mounting structure.
Figure 2:
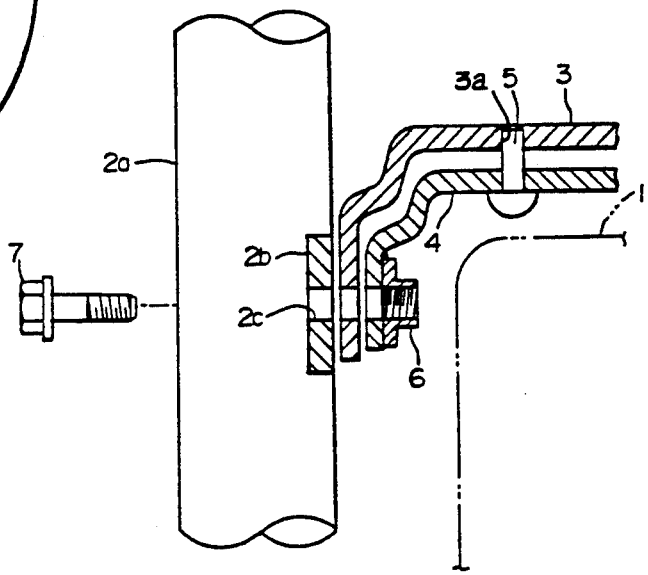
FIG. 2 is a sectional view showing the conventional front fender mounting structure of FIG. 1.
Figure 3:
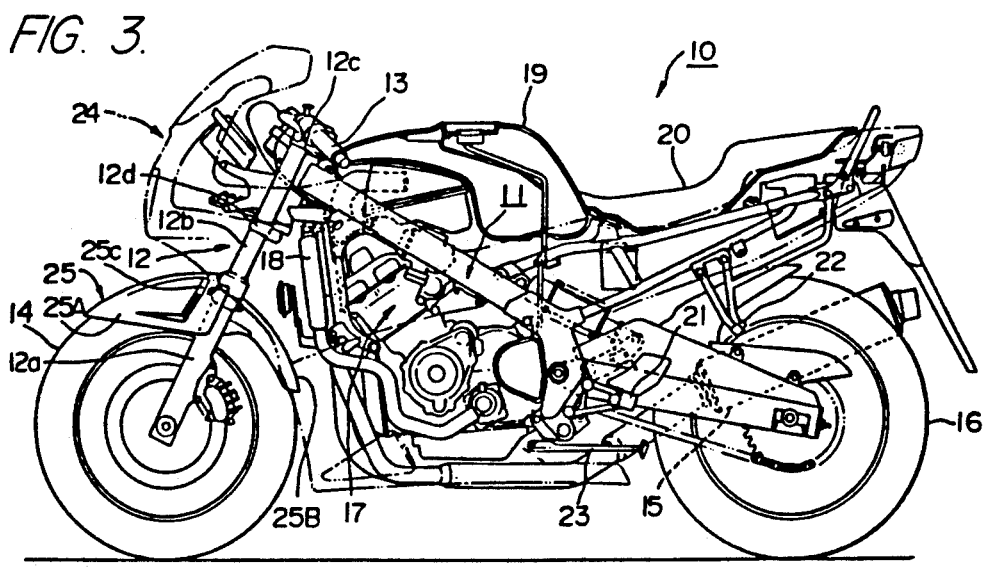
FIG. 3 is a side view showing the whole body of one embodiment of a two-wheeled motorcycle with portions of the fairings removed and shown in phantom.
Figure 4:
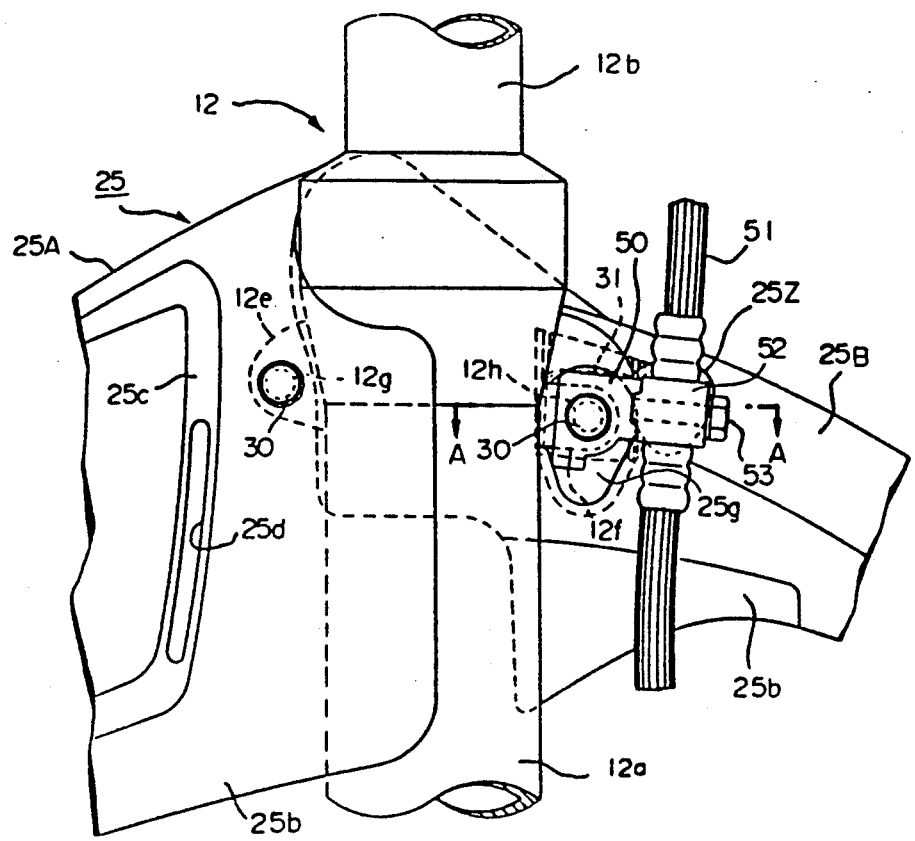
FIG. 4 is a side view showing a major portion of a front fender mounting structure of the present invention.

Turning in detail to the drawings, FIG. 3 is a side view of a motorcycle equipped with a front fender mounting structure. The motorcycle 10 shown in this drawing includes a vehicle frame 11, a front fork 12 rotatably supported at the front end section of the vehicle frame 11, a handlebar 13 for steering mounted at the top end of this front fork 12, a front wheel 14 rotatably supported at the forward end of a pair of right and left outer tubes 12a of the front fork 12, a rear fork 15 swingably supported on the vehicle frame 11, a rear wheel 16 rotatably supported at the rear end of this rear fork 15, a water-cooled engine 17 supported on the vehicle frame 11, a radiator 18 also supported on the vehicle frame 11, a fuel tank 19 mounted in the upper part of the vehicle frame 11, a seat 20 mounted at the rear of this fuel tank 19 for a rider and a passenger, steps 21 and 22 for the rider and the passenger, and a stowable stand 23 for supporting the vehicle in an erect position. Nearly the whole body of the vehicle body is covered with a cowling 24 indicated by phantom lines in the drawing.

Between a pair of outer tubes 12a, right and left, of the front fork 12 is installed a front fender 25 covering the upper part of the front wheel 14 by means of a mounting structure.

Figure 5:
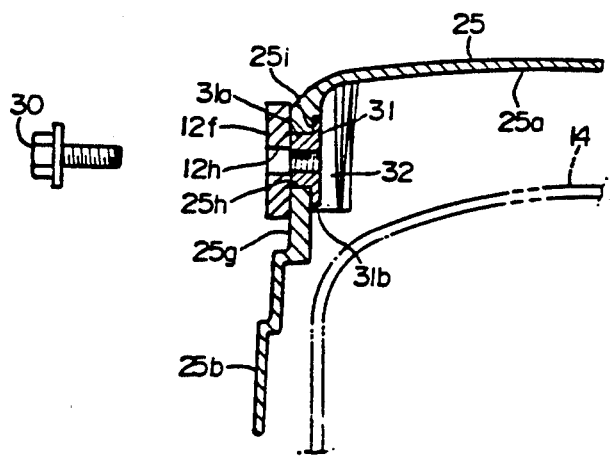
FIG. 5 is a longitudinal sectional view showing the front fender mounting structure.

In the following, the mounting structure of the front fender 25 of the present embodiment will be described in detail with reference mainly to FIGS. 4 to 7. First, this mounting structure of the front fender 25 is basically of such a construction that both side plate sections 25b of the front fender 25 and a bracket 12f installed on the front fork 12 are fastened by fasteners (flange bolts in this embodiment) 30 inserted from outside of the vehicle. A nut member 31 to be fastened together with the fastener stated above is installed on the inside surface of both the side plate sections of the front fender 25 and is elastically retained by means of nail pieces 32 extending to the inward of the inside surface of the side plate section 25b of the front fender 25 and to the inner surface of the upper portion of the front fender as seen in FIG. 5.

To give a more concrete explanation of the mounting structure of this front fender 25, first the front fork 12 comprises an outer tube 12a and an inner tube 12b slidably inserted into this outer tube 12a through a cushion (not illustrated), the inner tube 12b being inserted in, and fixed to, both the right and left ends of the top bridge 12c and the lower bridge 12d. The front fork 12 is formed integral with the steering stem, and rotatably mounted through the top bridge 12c and the lower bridge 12d.

At the front and rear positions of the outer tube 12a of the front fork 12 are mounted brackets 12e and 12f extending forward and rearward of the vehicle, constituting the mounting section of the front fender 25. The mounting hole 12g of the bracket 12e located at the front of the vehicle has internal threads so that the fastener 30 can be screwed into the mounting hole 12g. A mounting hole 12h of the bracket 12f located at the rear of the vehicle is a mere through hole into which the fastener can be inserted.

Next, the front fender 25 consists of a front cover section 25A disposed forwardly of the front fork 12 and large enough to cover to the front surface the outer tube 12a, and a rear cover section 25B extending to the rear from the front cover section 25A between the outer tubes 12a and covering the upper part of the front wheel 14. Either of these cover sections 25A and 25B is composed mainly of an upper plate section 25a and a side plate section 25b extending downward to cover the side of the front wheel 14 from the right and left of the upper plate section 25a.

The right and left side plate sections 25b of the front cover section 25A have a step section 25c, which is indented inwardly and provided with a long hole 25d extending along the direction of its length. Also, the right and left side plate sections 25b of the front cover section 25A are provided with a through hole in a position where it just comes at the bracket 12e, so that the fastener 30 can be inserted into the through hole.

On the other hand, the right and left side plate sections 25b of the rear cover section 25B are provided, in the bracket 12f area, with a recess section 25g at which the rear cover section 25B comes in contact with the bracket 12f. A mounting hole 25h is formed in this recess section 25g into which the fastener 30 will be inserted.

On the inside surface of the right and left side plate sections 25b of the rear cover section 25B is formed a step section 25i which fits on the top end of the nut member 31 as shown in FIG. 5, and there are provided the nail pieces 32 for elastically retaining the nut member 31 by elastically contacting both side edges of the nut member 31. These nail pieces 32 are plate-like as seen in side and edge views in FIGS. 5 and 6 and are formed extending rearwardly longer than the thickness of the flange section 31b of the nut member 31; and on the forward inside surface there are provided hook sections 32a projecting to engage with the flange section 31b of the nut member 31 in order to retain the nut member 31.

The nut member 31 comprises a body section 31a which fits in the mounting hole 25h of the front fender 25, the flange section 31b projectingly provided on the outer periphery of this body section 31a, and a threaded hole 31c formed through the body section 31a. The flange section 31b is made in the form of square plate so as to fit in closely between the projecting parallel nail pieces provided in order to prevent the rotation of the nut member 31 in the circumferential direction when the fastener 30 is screwed into the threaded hole 31c.

Figure 6:
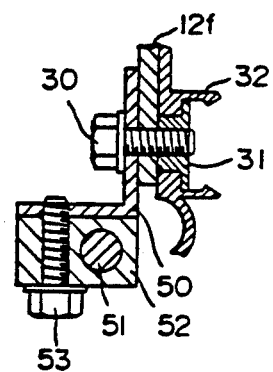
FIG. 6 is a sectional view taken along line A—A of FIG. 4.
Figure 7:
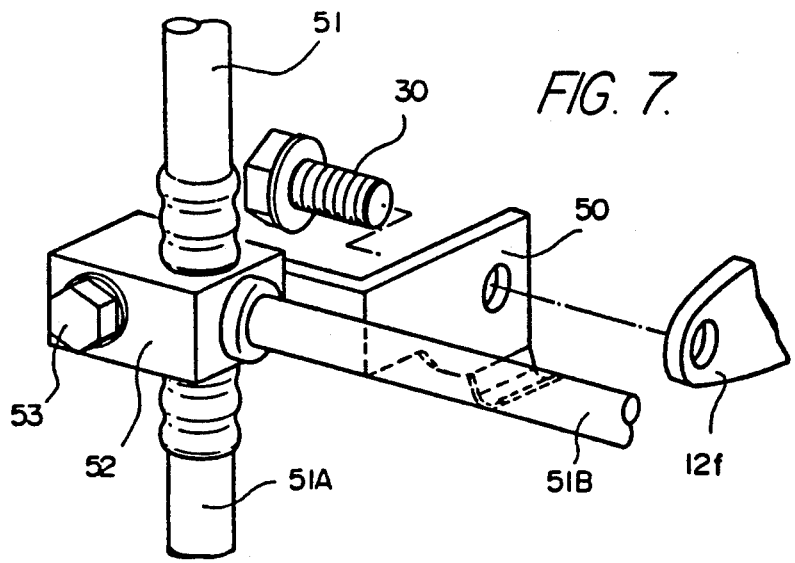
FIG. 7 is an exploded perspective view showing the mounting structure of a branch section of a brake hose.

On the bracket 12f installed on the front fork 12 to which the rear cover section 25B is mounted, a branch section 52 of the brake hose 51 is supported through a stay 50. This branch section 52 serves to branch brake oil being supplied through the brake hose 51 into a first brake hose 51A connected to a caliper on the left-hand side of the vehicle body and a second brake hose 51B connected to a caliper on the right-hand side of the vehicle body. It is fixedly installed by screwing the bolt 53 inserted through the branch section 52, into the stay 50 (see FIG. 6). This stay 50 is generally bent an angle as shown in FIG. 7, and is attached to the bracket 12f of the front fork 12 by means of the fastener 30 fastened to the nut member 31. Also, in the present embodiment, a recess section 25z is formed in the rear cover section 25B at the branch section 52 for the purpose of preventing interference of the branch section 52. In the following, the function of the mounting structure of the front fender 25 having the aforesaid constitution will be explained. To attach the front fender 25 to the front fork 12, the front fender 25 is inserted between the outer tubes 12a of the front fork 12 from the front of the vehicle body, with the nut member 31 elastically retained between the nail pieces 32 of the front fender 25, such that a mounting hole of the front cover section 25A will just come at the bracket 12f of the outer tube 12a, and then the recess section 25g formed in the rear cover section 25B of the front fender 25 is held in contact with the bracket 12f of the outer tube 12a, being retained in such a state that the mounting hole 12h of the bracket 12f will communicate with the mounting hole 25h of the rear cover section 25B. With the fasteners 30 inserted into the mounting holes provided in the cover sections 12A and 12B, and further inserted into the mounting hole 12g the bracket 12e and the nut member 31, the front fender 25 can be installed as shown in FIGS. 5 and 6. The stay 50 supporting the branch section 52 should be so designed and made as to be installed to the bracket 12f of the front fork 12 by means of the fastener 30.

The front fender 25 is installed by the following procedure. With the nut member 31 inserted between the nail pieces 32 and elastically retained on the inside surface of the side plate section 25b of the front fender 25, the front fender 25 is inserted between the outer tubes 12a of the front fork 12 and then fastened with the fasteners 30 inserted from the outside of the vehicle body through the brackets 12e and 12f. Particularly since the nut member 31 provided in the rear cover section 12B is elastically retained by means of the nail pieces 32 provided on the inside surface of the rear cover section, it is unnecessary to use such a fastening means as a rivet to install the nut member 31 and accordingly this front fender mounting operation can be performed quickly. In addition, because no rivet hole is required to be formed in the front fender 25, the appearance of the front fender 25 will never be impaired.

Furthermore, in the present embodiment, the nut member 31 is elastically retained on the inside surface of the side plate section of the front fender 25 by means of the nail pieces 32 of the front fender 25 with the threaded hole of the nut member 31 properly aligned with the mounting hole 25h of the front fender 25. Therefore, it is possible to easily screw the fastener 30 into the threaded hole 31c of the nut member 31 by turning the fastener 30 into the mounting hole 25h of the front fender 25 from the outside of the vehicle body; this installation procedure will never deteriorate operational performance at the time of installation of the front fender.

According to the front fender mounting structure, the following advantages can be obtained:

(1) Because the nut member to be tightened to the fastener is provided on the inside surface of both the side plate sections of the front fender and the nut member is elastically retained by nail pieces extending inwardly from the inside surface of the side plate section of the front fender, it is not necessary to provide such a means as riveting for installing the nut member. And also because the installation operation can be done quickly with the nut member retained with the nail pieces on the inner side of the front fender, it is possible to further improve front fender mounting operation efficiency. Furthermore since no rivet mounting hole is needed in the front fender, the front fender can be mounted without deteriorating its good appearance.

(2) Furthermore, since the nut member is designed to be elastically retained by the nail pieces extending inwardly from the inside surface of the side plate section of the front fender, a metal support plate for mounting the nut member can be dispensed with, thereby decreasing the cost.

Figure 8:
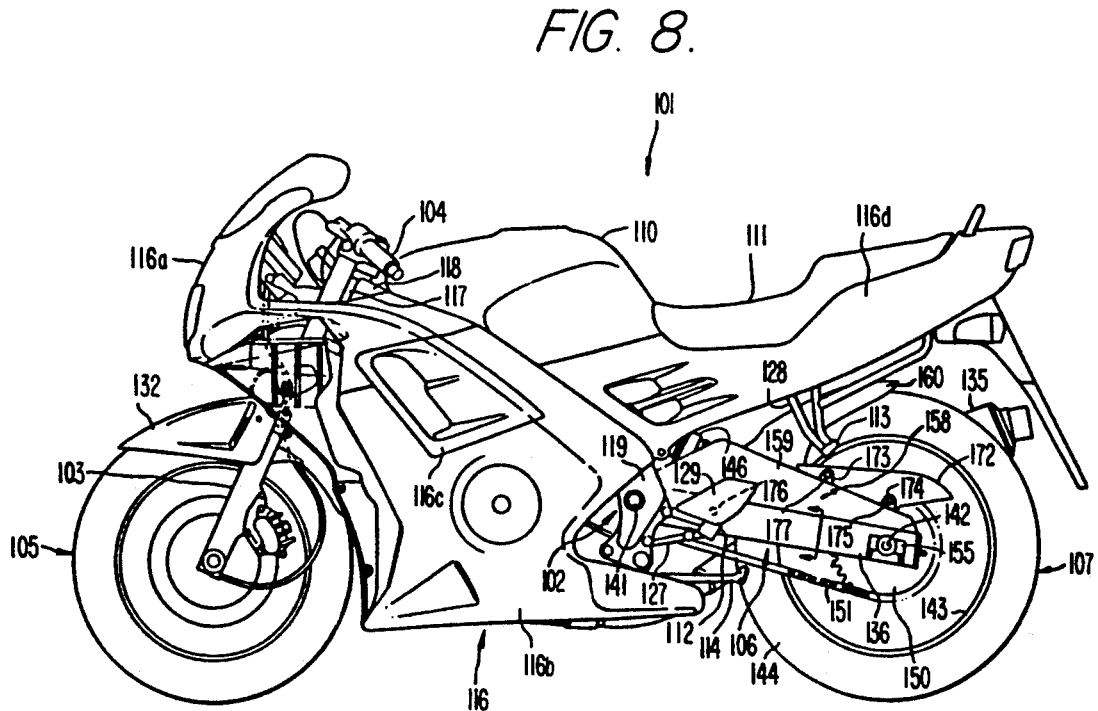
FIG. 8 is a side view of a motorcycle of the present invention with the fairings in place.
Figure 9:
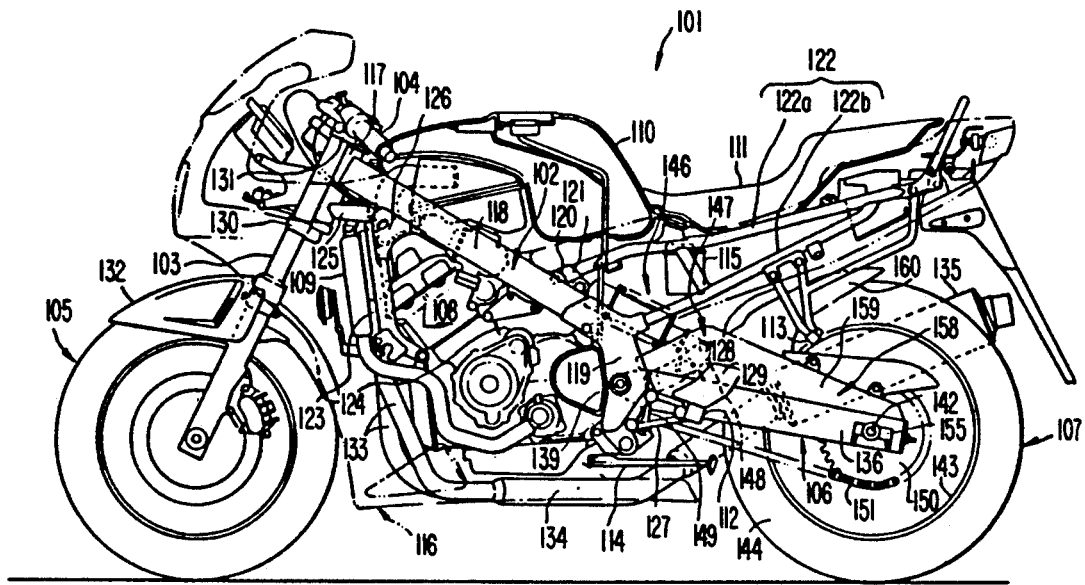
FIG. 9 is a side view of a motorcycle showing the whole body with portions of the fairings removed and shown in phantom, indicating further element.

Hereinafter one embodiment of the rear fender mounting structure for two-wheeled motorcycles will be explained with reference to the accompanying drawings. FIGS. 8 and 9 show the side of a motorcycle to which the present invention is applied. This motorcycle 101 has a vehicle frame 102, a pair of front forks 103, right and left, which are rotatably supported at the front end section of the vehicle frame 102, a steering handlebar 104 mounted at the top end section of these front forks 103, a front wheel 105 rotatably supported on the front forks 103, a rear fork 106 swingably supported on the vehicle frame 102, a rear wheel 107 rotatably supported at the rear end section of the rear fork 106, an engine 108 supported on the vehicle frame 102, a radiator 109 also supported on the vehicle frame 102, a fuel tank 110 mounted in the upper part of the vehicle frame 102, a seat 111 located at the rear of the fuel tank 110 for seating of a rider and a passenger, steps 112 and 113 for the rider and the passenger, a stowable stand for supporting the vehicle body in an erect state during parking, and a battery 115 mounted beneath the seat. Almost all the vehicle body is covered with a cowling 116.

The vehicle frame 102, as shown in FIG. 9, includes a head pipe 117 at the front end. A pair of right and left main tubes 118 (in FIG. 9 only the left main tube is visible) are branched to the right and left tubes from the head pipe 117 and extend backward and obliquely downward. The rear end section of the main tube 118 is welded in an inserted state to a downwardly extending pivot bracket 119. A cross member 120 is laterally mounted between the rear end sections of the main tubes 118. A seat rail 122 comprises an upper rail 122a with its front end welded to the cross member 120 through a pipe-like bracket 121 and extending backwardly, and a lower rail 122b with its front end inserted and welded to the rear part of the upper end section of the pivot bracket 119 and with its rear end welded to the rear end section of the upper rail 122a. At the front and rear parts of the main tubes 118 are welded a hanger pipe 123 extending downward and a hanger plate 124 extending forwardly. Also at the top end section of the hanger pipe 123 and the head pipe 117 is welded a reinforcing pipe 125 which connects these two pipes. And further, at the front end section of the main tube 118 and at the top end section of the hanger pipe 123 a gusset 126 connecting these tube and pipe is attached by welding. The cowling 116 is fixedly attached by means of rivets to the vehicle frame 102 of the above-described constitution. This cowling 116 can be divided, as shown in FIG. 8, into an upper cowl 116a which covers the front part of the vehicle body, an under cowl 116b which covers the lower part of the vehicle body, a center cowl 116c disposed between these cowls, and a seat cowl 116d which covers the lower part of the seat 111.

The step 112 for the rider is fixedly installed to the pivot bracket 119 through a step holder 127, while the step 113 for the passenger to the lower rail 122b is fixed through a step bracket 128. The step holder 127 has a step plate 129 formed integral therewith for the purpose of preventing the rider's foot from moving toward the vehicle body and also positioning the rider's foot on the step 112. This step holder 129 is located inside of the step 112 which the rider's ankle contacts. The stand 114 is installed on the lower side of the pivot bracket 119.

In the head pipe 117 of the vehicle frame 102 is axially rotatably inserted a steering stem (not illustrated), at the lower end of which a lower bridge 130 is integrally formed. At the top end section of the steering stem which projects out of the head pipe 117, a top bridge 131 is secured. In the top bridge 131 and the lower bridge 130 is inserted and secured the front fork 103, and at the lower end is supported the front wheel. The handlebar 104 is fitted and fixed on the top end part of each front fork 10 protruding out of the top bridge 131. On the front fork 103 is mounted a front fender 131 covering the upper part of the front wheel 105.

The engine 108 in this case is a four-cylinder, in-line engine bolted to the hanger pipe 123, the hanger plate 124 and the pivot bracket 119. At the front of the engine 108 are connected exhaust pipes 133 by each cylinder. These exhaust pipes 133 are collected to a single collecting pipe extending rearwardly. At the rear end of this collecting pipe 134 a muffler 135 is connected. The radiator 109 is fixedly mounted to the hanger pipe 123.

Figure 10:
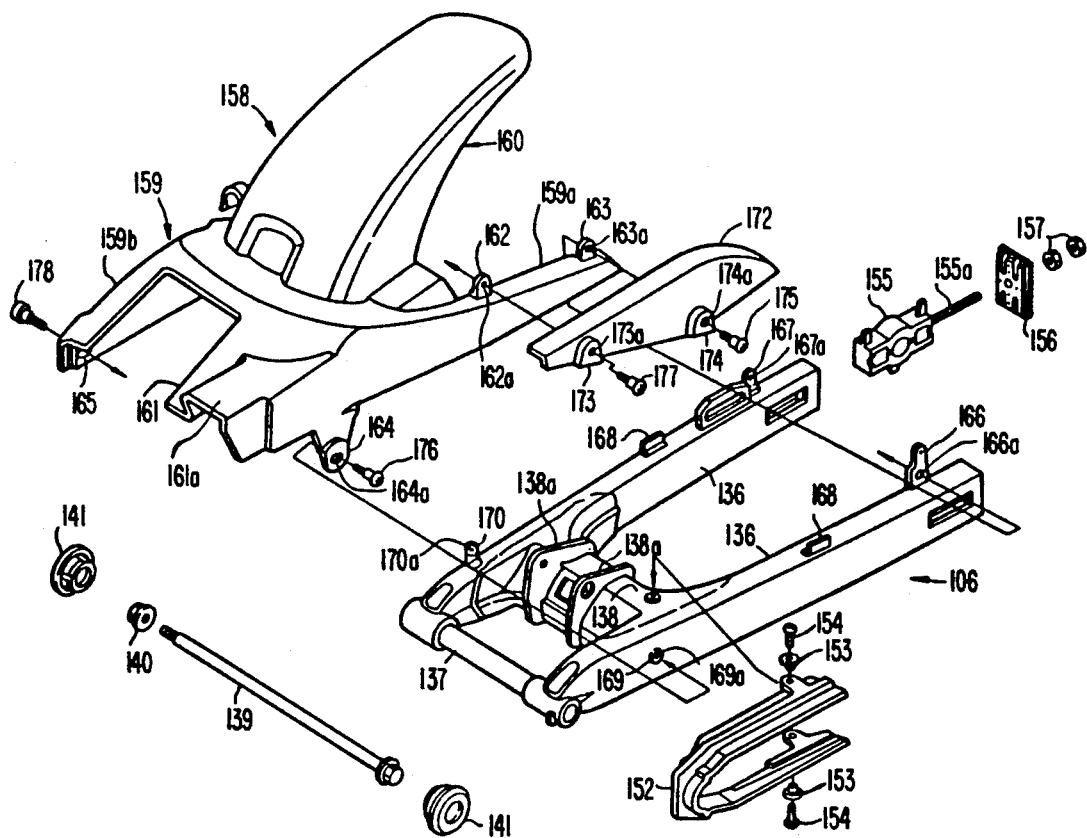
FIG. 10 is an exploded perspective view of a rear fender and rear fork assembly.

The rear fork 106 previously described is produced of iron for example, and, as shown in FIG. 10, is formed by a bearing pipe 137 extending in a lateral direction at the front end of the pair of hollow square tubular fork sections 136, right and left, which extend rearwardly, and by a cross member 138 at a slightly rearward part thereof. That is, the rear fork 106 is inserted in the bearing pipe 137 and pivotally supported by a pivot bolt 139 installed between the right and left pivot brackets 119, thereby permitting the fork sections 136 to swing up and down on the axis of the pivot bolt 39. In FIG. 10, a numeral 140 refers to a pivot nut to be screwed onto one end of the pivot bolt 139; and a numeral 141 denotes a cap to be fitted in the pivot bracket 119 to cover the head of the pivot bolt 139 and the pivot nut 140.

The rear wheel 107 comprises a tire 144 mounted on a wheel 143 with an axle 142 inserted in the center of the axis thereof. The axle 142 is inserted and fixed in a longitudinally long through hole provided in the rear end section of each of the fork sections 136 of the rear fork 106, thus being supported by the rear fork 106. A rocking motion which the rear wheel receives from the road surface is absorbed by a cylindrical rear cushion unit 146. This rear cushion unit 146 is connected by a pin at one end to a cross member (not illustrated) secured throughout between the right and left main frames 117, and also by a pin at the other end to the rear fork 106 through a link mechanism 147. This link mechanism consists of a first link 148 and a second link 149. The first link 148 is connected by a pin at one end to the above-mentioned other end of the rear cushion unit 146, by a pin at the central part to the bracket 138a of the cross member 138 of the rear fork 106, and also by a pin at the other end to one end of the second link 149. The other end of the second link 149 is connected by a pin to a cross member (not illustrated) provided between the lower ends of the right and left pivot brackets 119. On the left side of the wheel 143 of the rear wheel 107 a driven sprocket 150 is fixed coaxially with the wheel 143. On this driven sprocket 150 is installed a drive chain also mounted on a drive sprocket (not illustrated) coupled with the engine 108.

On the left side of the bracket 138a of the cross member 138 in the rear fork 106, as shown in FIG. 10, a chain protector 152 is fixed by screws 154 through washers 153, serving to prevent direct contact of the drive chain 151 with the cross member 138 and to guide the drive chain 151. Also, at the rear end of each fork section 136, a chain adjuster 155 in which the axle 142 is inserted is assembled inside in such a manner that it is slidable in the direction of length of the fork section 136. The position of this chain adjuster 155 in relation to the fork section 136 can be changed by means of two nuts 157 which are turned, through a chain adjuster plate 156, into a screw 155a provided at the rear end of the chain adjuster 155. Thus changing the chain adjuster position moves the axle 142 in the longitudinal direction along the through hole 145, thereby adjusting the tension of the drive chain 151.

On the rear fork 106 is attached a rear fender 158. This rear fender 158, as shown in FIG. 10, comprises a nearly U-shaped rear fork cover section 159 covering the fork section 136 of the rear fork 106 and the upper surface of the cross member 138, and a fender section 160 curved to cover the upper front part of the rear wheel 107, the rear fork cover section 159 and the fender section 160 being molded of a resin in a single body. The rear fork cover section 159 is provided at the center of its front end with a square cut out 161 where the rear cushion unit 146 is disposed. And, on the left side (on the right side in FIG. 10), there is formed an expanded section 161a forming a hollow part through which the drive chain 151 passes. Right and left-hand extended sections 159a and 159b of the rear fork cover section 159 covering the fork section 136 have a flat lower surface along the upper surface of the fork section 136, but have a triangular upper surface inclining backward and forward from a vertex thereof located above the cross member 139 as viewed form the side. The left-hand extended section 159a has bosses 162 and 163 fixedly attached at a spacing, facing upward, on the upper surface of the rear end section thereof. In the front end section a boss 164 extending downward is formed in one body. Of these bosses 163 and 164, the rear and front bosses 163 and 164 have through holes 163a and 164a respectively, while the center boss 162 is provided with a threaded hole 162a. The right-hand extended section 159b is provided with through holes 65 at the front and rear (in FIG. 10, only the through hole at the front is seen).

Figure 11:
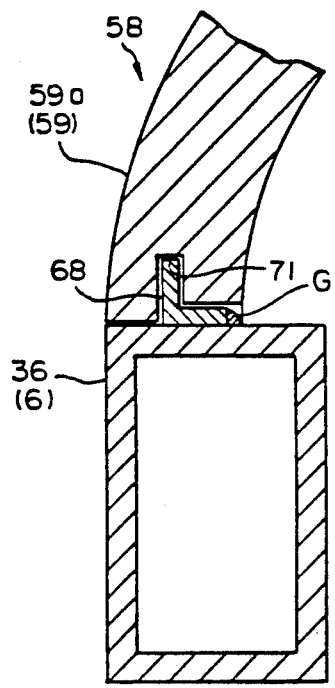
FIG. 11 is a cross-sectional view taken along 11—11 of FIG. 8.

On the other hand, the right and left-hand fork sections 136 of the rear fork 106 have, in the rear end part on the upper surface thereof, upwardly projecting bosses 166 (mounting section) and 167 having threaded holes 166a and 167a, respectively, fixedly attached. A little rearward of the center in the direction of length, projecting pieces (projecting sections) 168 having an L-shaped section are fixedly attached by welding at a part indicated by a reference letter G in FIG. 11. In the side of the front end part of the left-hand fork section 136, there is formed a boss 169 having a threaded hole 169a at center, and on the upper surface of the front end part of the right-hand fork section 136 there is fixedly attached a boss 170 having a threaded hole 170a. The boss 169 is formed in an outwardly invisible position opposite to the back side of the step plate 129 as shown in FIGS. 8 and 9 as viewed from the left side of the motorcycle 1. On the lower surface of each of the left and right-hand extended sections 159a and 159b of the rear fender 158, there is formed, as shown in FIG. 11, a recess section 171 in which the projecting piece 168 fixedly attached on the upper surface of each fork section 136 of the rear fender 158 fits. With the projecting pieces 168 fitted in these recess sections 171 to set the left and right-hand extended sections 159a and 159b on the upper surfaces of fork sections 136, the boss 163 of the left-hand extended section 159a of the rear fender 158 mates with the boss 166 with the through hole 163a registering with the threaded hole 166a, and also the boss 164 mates with the boss 169 with the through hole 164a registering with the threaded hole 169a. Furthermore, the through holes 165 located at the front and rear of the right hand extended section 159b register respectively with the threaded hole 170a of the boss 170 and the threaded hole 167a of the boss 167 of the fork section 136. In this state, the extended sections 159a and 159b of the rear fork cover section 159 and the fork section 136 of the rear fork 106 are positioned so that their side faces will become nearly flush with each other.

In FIGS. 8 to 10, a numeral 172 refers to a chain case 172 which covers a part of the drive chain 151 wound on the driven sprocket 150 and the upper front part thereof. This chain case 172 is of an L-shaped section with the inside surface of the recess directed towards the vehicle body. The rear side of this chain case 172 is expanded in a circular form. At the front lower and rear lower ends, there are formed bosses 173 and 174 to be joined with the front and rear bosses 162 and 163 on the left hand extended section 159a of the rear fender 158. These bosses 173 and 174 are provided with through holes 173a and 174a which will register with the threaded hole 162a of the boss 162 and with the through hole 163a of the boss 163.

The rear fender 158 described above is mounted to the rear fork 106 by the following procedure. As described above, the lower surfaces of the left and right hand extended sections 159a and 159b are properly set on the fork section 136 with the projecting piece 168 fitted in the recess section 171. With a pair of bosses 163 and 166 properly aligned with the bosses 164 and 169, and further with the bosses 173 and 174 of the chain case 172 properly aligned with the bosses 162 and 163, the screw (fastening member) 175 inserted in the through hole 174a of the boss 174 and the through hole 163a of the boss 163 is tightened into the threaded hole 166a of the boss 166. Also the screw 176 inserted into the through hole 164a of the boss 164 is tightened into the threaded hole 169a. The front boss 173 of the chain case 172 is fastened by the screw 177 to the boss 162. Thus the left-hand extended section 159a of the rear fender 159 is fixed to the left-hand fork section 136 of the rear fender 158. In the case of the right-hand extended section 159b, the screws 178 inserted in the front and rear through holes 165 formed in the side of the extended section are turned into the threaded holes 170a and 167a of the bosses 170 and 167 provided on the right-hand fork section 136. The rear boss 174 on the chain case 172 and the rear boss 163 on the left-hand extended section 159a of the rear fender 158 are fastened together by the screw 175 to the rear boss 166 on the left-hand fork section 136 of the rear fork 106. In this mounted state, as previously stated, the extended sections 159a and 159b of the rear fork cover section 159 and the outside surface of the fork section 136 of the rear fork 106 are nearly flush with each other. When the motorcycle 101 is viewed from the left side, the screw 176, concealed behind the step plate 129, is not easily visible.

According to the rear fender mounting structure of the present embodiment for mounting the rear fender 158 to the rear fork 106, in the left side view of the motorcycle 101, the rear fender 158 is fixed by the screws 175 and 176 to the rear fork 106. Of these screws, only the screw 175 is used to fix the chain case 172 to the rear fender 158. Since the screw 176 is concealed behind the step plate 129, a member fixing the rear fender 158 to the rear fork 106 is outwardly not conspicuous. The rear fork 106 rocks up and down with shocks from the road surface during travel, but the front end thereof, concealed behind the step plate 129 and located close to the bearing pipe 137 which serves as a rocking shaft, rocks through a small angle and, therefore, the screw 176 is invisible even during travel. Furthermore, the side faces of the left and right hand extended sections 159a and 159b in the rear fork cover section 159 of the rear fender 158 are nearly flush with the side faces of the fork sections 136 of the rear fork 106. The rear fork 106 and the rear fender 158 appear as if formed in a single-body structure. Furthermore, since the rear fender 158 is coated in the same color (color of aluminum) as the rear fork 106, the appearance of these two members appearing as if produced en bloc is further improved to obtain a better design effect. Furthermore, because the rear fender 158 is fastened together with the chain case 172, it is possible to decrease such fastening members as screws for fixing the rear fender 158 to the rear fork 106. Furthermore, because the rear fender 158 can be positioned easily and properly in relation to the rear fork 106 simply by fitting the projecting piece 168 of the fork section 136 in the recess section 171 provided in the lower surfaces of the extended sections 159a and 159b, this has the advantage that it is possible to improve mounting operation and to reduce the time required for mounting.

According to the rear fender mounting structure for vehicles such as two-wheeled motorcycles, an attaching member for attaching the rear fender to the rear fork is used outwardly to attach only the chain case to the rear fender. Since the member for attaching the rear fender to the rear fork is invisible, the rear fork and the rear fender are viewed as if formed in a single-body structure, and accordingly it is possible to improve the design effect that creates the single body-like appearance, and, at the same time, to decrease fastening members as screws for attaching the rear fender to the rear fork.

Hereinafter a preferred embodiment of the cowling to fuel tank joining structure is described with reference to the accompanying drawings. In this explanation, the designation of a member of the joining structure as a front or rear, and left-hand or right-hand is determined by the location of the member as viewed in the direction of travel of the vehicle.

Figure 12:
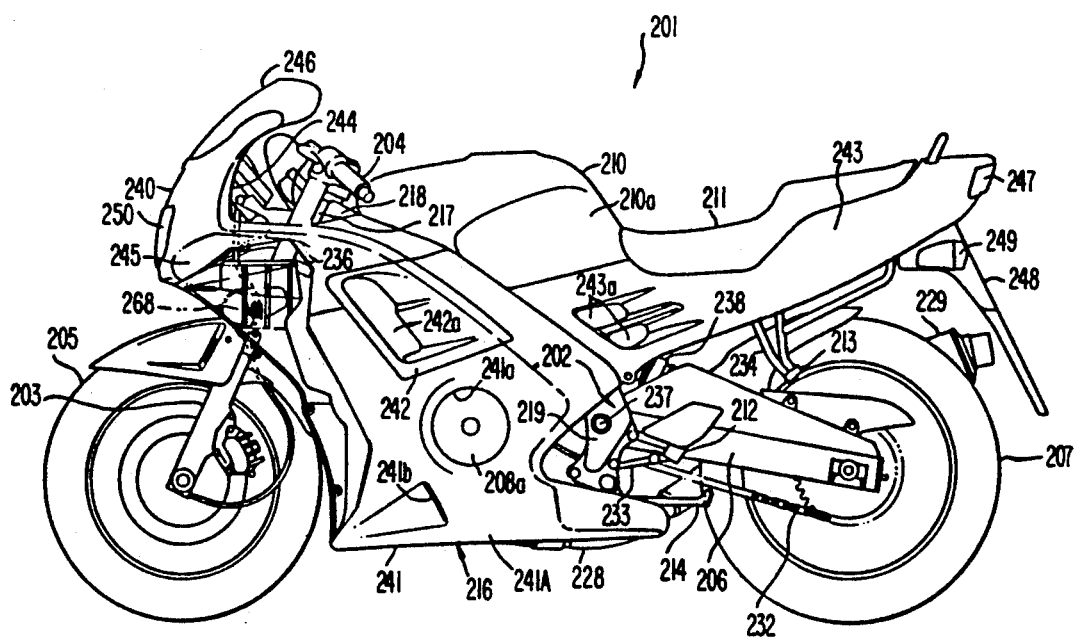
FIG. 12 is a side view of a motorcycle of the present invention with the fairings in place indicating further elements.
Figure 13:
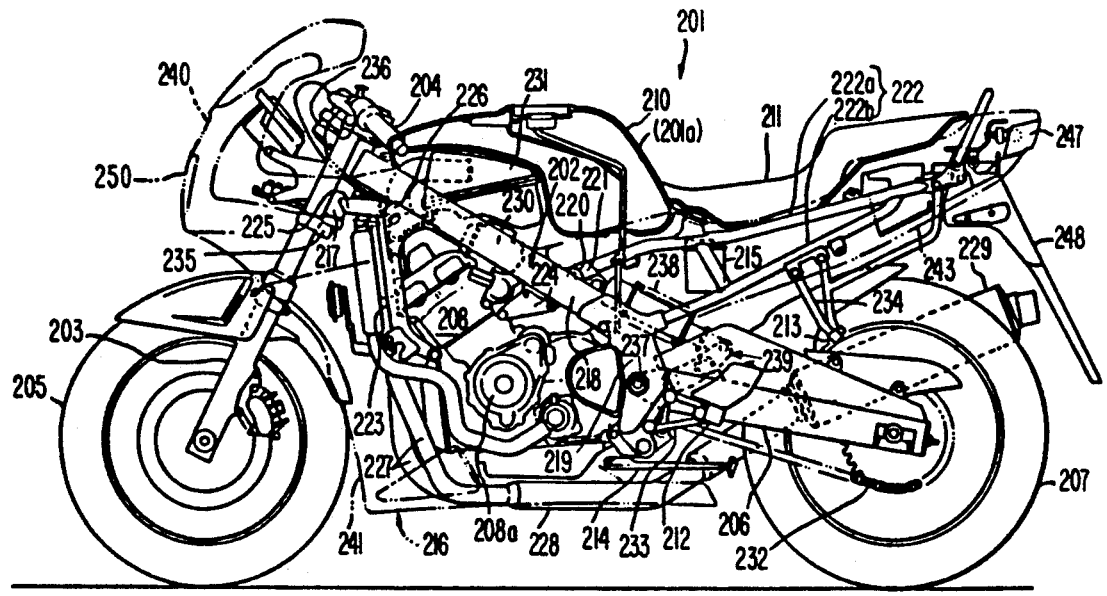
FIG. 13 is a side view of a motorcycle showing the body with the fairings removed and shown in phantom, indicating further elements.

FIGS. 12 and 13 are general side views of a two-wheeled motorcycle 201. This motorcycle 201 comprises a vehicle frame 202, a pair of front forks 203, right and left, rotatably supported at the front end section of the vehicle frame 202, a handlebar (steering) 204 mounted at the top end section of the front fork 203, a front wheel 205 rotatably supported on the front fork 203, a rear fork 206 swingably supported on the vehicle frame 202, a rear wheel 207 rotatably supported at the rear end section of this rear fork 206, an engine 208 supported on the vehicle frame 202, a radiator 209 supported on the same vehicle frame 202, a fuel tank 210 set in the upper part of the vehicle frame 202, a seat 211 for a rider and a passenger which is located at the rear part of the fuel tank 210, steps 211 and 212 for the rider and the passenger, a stowable stand 214 for supporting the vehicle body in an erect state during parking, and a battery 215 mounted beneath the seat. Almost all the vehicle body is covered with a cowling 216.

To describe more particularly by referring to FIG. 13, the vehicle body 202 comprises a head pipe 217 at the front end, a pair of main tubes 218, right and left, (in FIG. 13, only the left hand tube is visible) extending rearward and obliquely downward after being branched off from the head pipe 217, a pivot bracket 219 extending downward with the rear end section of the main tubes 218 welded in an inserted state, a cross member 220 mounted in lateral direction astride the rear end section of the main tubes 218m, and a seat rail 222 including an upper rail 222 which is welded at the front end to the cross member 220 through a pipe-like bracket 221 and extends rearward, and a seat rail 222 which is inserted and welded at the front end to the rear part of the top end section of the pivot bracket 219 and has a lower rail 222b welded at the rear end to the rear end section of the upper rail 222a. At the front and rear of the main tubes 218, a hanger pipe extending downwardly and a hanger plate 224 extending forwardly are welded. At the top end section of the hanger pipe 223 and the head pipe 217, a reinforcing pipe 225 connecting these pipes is welded. Furthermore, at the front end section of the main tubes 218 and at the top end section of the hanger pipe 223, a gusset 226 is welded to connect the both.

The engine 208 shown here is a four-cylinder, in-line engine and bolted to the hanger pipe 223, the hanger plate 224, and the pivot bracket 219. At the front part of the engine 208 are connected exhaust pipes 227 by each cylinder. These exhaust pipes 227 are collected to a single collecting pipe 228 extending rearward. At the rear end of this collecting pipe 228 is connected a muffler 229. A carburetor 230 is connected to the engine 208 and to this carburetor is connected an air cleaner 231 mounted beneath the fuel tank 210. Power from the engine 208 is transmitted to the rear wheel 207 through the drive chain 232. The radiator 209 is fixedly attached to the hanger pipe 223.

The step 212 for the rider is fixedly installed to the pivot bracket 219 through the step holder 233, while the step 213 for the passenger is fixedly attached to the lower rail 222b through a step bracket 234. The stand 214 is installed to the underside of the pivot bracket 219.

In the head pipe 217 of the vehicle frame 202, a steering stem (not illustrated) provided in one body with a lower bridge 235 at the lower end is axially rotatably inserted. A top bridge 236 is fixed on the top end section of the steering stem which protrudes out of the head pipe 217. The front fork 203 is inserted and fixed in the top bridge 236 and the lower bridge 235, and the front wheel 205 is supported on the lower end thereof. The handlebar 204 is fitted and fixed in the top end section of each front fork 203 which protrudes out of the top bridge 236.

The rear fork 206 is pivotally supported on a pivot 237 with its front end mounted between the pivot brackets 219, and therefore is vertically swingable on the axis of this pivot 237. On the swinging rear end is supported the rear wheel 207. The swinging motion of the rear wheel 207 is damped by means of the rear cushion unit 238. This rear cushion unit 238 is mounted with its one end connected by a pin to a cross member (not illustrated) disposed between the rear end sections of the right and left main tubes 218, and with the other end also connected by a pin to the front end section of the rear fork through a link mechanism 239.

The cowling 216 is fixed to the vehicle frame 202 of the above-described constitution by means of fastening means such as screws. This cowling 216, as shown in FIG. 12, may be broken down into an upper cowl 240 covering the periphery of the handlebar 204 located at the front part of the vehicle body, an under cowl 241 covering the side of the engine 208 and its peripheral equipment, a center cowl 242 installed between the cowls 240 and 241, and a seat cowl 243 extending to the rear part of the vehicle body, covering the lower side surface of the seat 210. These cowls are assembled in a streamline form and fixedly installed to the vehicle frame 202.

The upper cowl 240 is molded in a streamline form extending rearward from the front of the head pipe 217 on the vehicle frame 202, with both side sections extending to the front part of the fuel tank 210 to cover both sides of the upper part of the right and left front forks 203. On both sides are formed cutouts 244 for preventing interference of the upper cowl 240 with the handlebar 204; blow the cutout 244 is formed an air inlet port 245; and further at the top end of the front part is provided a screen 246 in one body curved upward of the top bridge 236.

The under cowl 241 is an assembly of a pair of under cowl split members 241A, right and left (in FIG. 12 only the left-hand member is shown). The under cowl 241 has a substantially U-shaped section. The top end section thereof is disposed along the main tube 218 to cover the main tube 218. The under cover 241 has a hole 241a at center in which is fitted the end of a crankcase 208a of the engine 208. At the lower forward part thereof is formed an air inlet port 241b.

The center cowl 242, which is molded nearly in a rhombic form, has an air outlet port 242a at center for guiding out exhaust heat from the radiator 209 and the engine 208.

The seat cowl 243 is provided to cover the side of the right and left seat rails 243. In the front end section thereof an air outlet port 243a is formed to guide exhaust heat out. At the rear end thereof a tail light 247 is mounted which serves also as a stoplight, and below the taillight 247 a rear fender 48 extends obliquely rearwardly and downwardly. Further on the right and left of this rear fender 248 are mounted direction indicators 249.

Of the cowling 216 of the above-described constitution, the upper cowl 240 is a feature of the present embodiment; in the following, therefore, this upper cowl 240 will be explained in detail.

Figure 14:
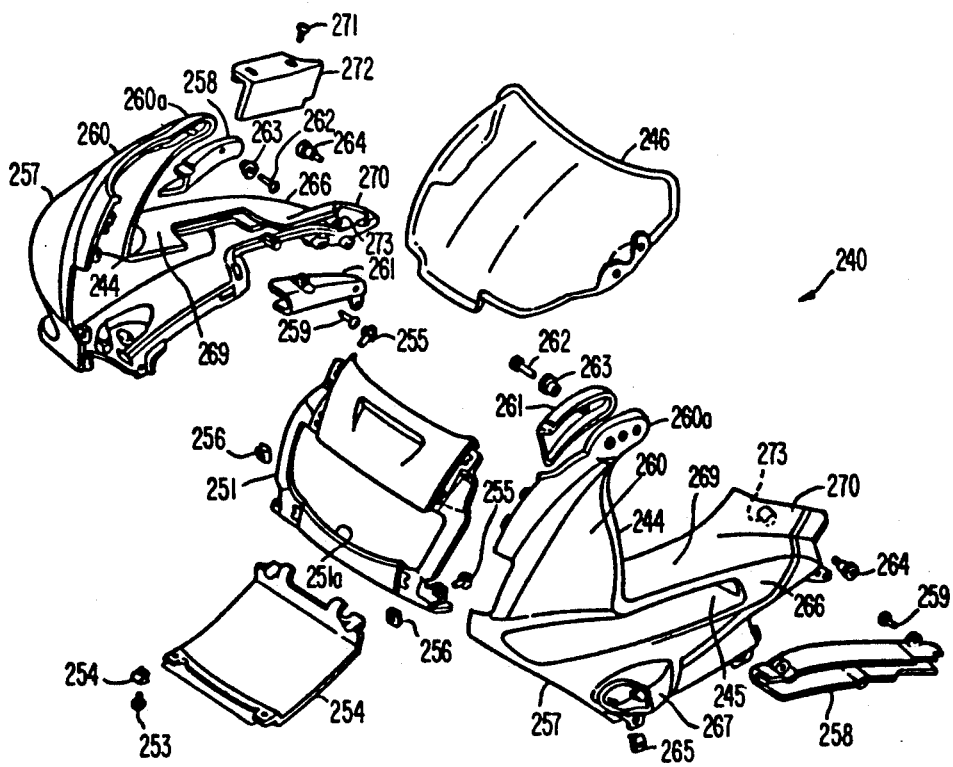
FIG. 14 is an exploded perspective view showing the upper cowl.

The upper cowl 240, as shown in FIG. 14, comprises a front cowl 251 provided with a mounting hole 251a in which a headlight 250 is mounted, a front under cover 254 installed by screws 252 and nuts 253 to the underside of the front cowl 251, a pair of side cowls 257, right and left, installed by screws 255 and nuts 256 to both sides of these cowls 251 and 254, and the screen 246 installed between the front cowl 251 and the right and left side cowls 257. Each side cowl 257 is provided with the cutout 244 and the air inlet port 245; a duct 258 of a channel-shaped section continued to this air inlet port 245 is secured by a screw 259 to the inside surface of the side cowl 257. Also, stay 261 for a rear view mirror (not illustrated) is installed on the inside surface of a bracket section 260a at the forward end of a rising section 260 which extends upward of the front part of the side cowl 257. This stay 261 and the bracket section 260a are tightened together to an upper cowl stay (not illustrated) by a screw 262 through a rubber 263. In FIG. 14, a numeral 264 refers to a bolt for securing the side cowl 257 to the vehicle frame 202, and a numeral 265 denotes a nut for securing the under cowl 241 to the side cowl 257.

In the right and left side cowls 257, there is continuously formed a side section 266 having the air inlet port 245, extending rearward from the lower part of the rising section 260. Below the air inlet port 245 of this side section 266 is formed a direction indicator mounting section 267 for mounting the direction indicator 268. The side section 266 has at the top end a horizontal part 269 extending nearly horizontally toward the inside of the vehicle body, and further has at the rear end of the horizontal section 269 a slant section 270 extending obliquely upwardly and inwardly. The slant section 270, as shown in FIGS. 14, 15 and 16, covers the front end of the main tube 218, continuing to the side of the fuel tank 210 to close the gap between the slant section 270 and the front part of the fuel tank 210 set on the vehicle body, thus forming a curved continued shape between the fuel tank 210 and the slant section 270. In the horizontal section 269 of the left side cowl 257, a space is provided to contain fuses. To open and close this space, a removable cover 272 is attached by screws 271.

The fuel tank 210, as shown in FIG. 16, is mounted by welding a tank bottom plate 210b to a tank body plate 210a. The welded section of these plates, located a little inside of the fuel tank 210 and protruding downward, forms a lower edge 210c of the fuel tank 210.

On the inside surface of the slant section 270 of the side cowl 257, a cylindrical boss (projection) 273 is formed integral with the cowl, extending nearly horizontally toward the inside. This boss 273 is fitted on its outside surface with a ring-like elastic member 274 produced of rubber. The fuel tank 210 is mounted on the vehicle body with the forward end of the lower edge 10c pressing the elastic member 274. It is desirable that a force applied to press this elastic member 274 be set to a value not too great to deform the side cowl 257 including the slant section 270, but to a value great enough to slightly elastically deflect the elastic member 274. In this state, the slant section 270 and the outside surface of the tank body plate 210a of the fuel tank 210 together form an interrupted curved surface.

When the motorcycle 201 is running, the wind entering the vehicle body from the underside of the upper cowl 240 hits against the inside surface of the slant section 270 of the side cowl 257 of the upper cowl 240, working to raise the slant section 270 outward. However, this slant section 270, being pressed against the lower edge 210c of the fuel tank 210 through the elastic member 274 and the boss 273 as described above, can be rest rained from rising with the wind. Since this structure can be achieved simply by setting the fuel tank 210 on the vehicle frame after attaching the upper cowl 240 to the vehicle frame 202, the rise of the slant section 270 can easily be prevented without use of such fastening means as bolts, and in addition the bolts will never be exposed to impair the curved surface continued to the fuel tank 210, thus gaining a good outward appearance. Further, the structure has the following advantage that since the forward end of the lower edge 210c of the fuel tank 210 is in contact with the elastic member 274, not directly with the boss 273, the forward end and the boss 273 will not injure each other and also the upper cowl 240 and the fuel tank 210 will be restrained from vibrating.

Thus, the cowling to fuel tank joining structure has the upper cowl extending from around the headlight mounted at the front of the vehicle body and through around the steering stem. The upper cowl is attached to cover the vehicle body, continuing to the side surface of the fuel tank. On the inside surface of the upper cowl are provided projections protruding nearly horizontally. The fuel tank is set on the vehicle body with the lower edge thereof in contact with these projections. Since the projections provided on the inside surface of the upper cowl are pressed against the lower edge of the fuel tank, the part of the upper cowl continued to the fuel tank can be held from rising without use of such fastening means as bolts if the wind entering the cowling works to raise the part during travel. In addition, no bolt is exposed over the surface to impair the uninterruptedly curved shape of the upper cowl and the fuel tank, thus obtaining a good outward appearance. Furthermore, because of the use of the elastic members on the projections, the bosses and the lower edge of the fuel tank will never injure each other, and moreover the upper cowl and the fuel tank can be restrained from vibrating.

Hereinafter one embodiment of an engine intake structure is explained with reference to the accompanying drawings. FIG. 17 is a side view of a two-wheeled motorcycle. A frame 301 consists of a pair of main frames 303, right and left, extending from the upper part of a head pipe 302 to the vicinity of a pivot section 304, and right and left seat rails 307 extending from a cross member 306 situated across the right and left main frames 303 to the obliquely upper rearward, the rear part of the seat rails 307 being connected to the rear end of a back stay 308 extending from the rear part of the main frames 303 to the obliquely upper rearward. In the head pipe 302 is rotatably inserted a steering stem, through which a front wheel is supported through a front fork 310.

At the rear of the heat pipe 302, a fuel tank 312 is situated astride the right and left main frames 303 and slightly off upward from these main frames 303. The front part of a bottom plate 312a of this fuel tank 312 is largely depressed to form a recess 313, in which an air cleaner 315 is mounted. At the rear of the fuel tank 312 is mounted a seat 316. Beneath the main frames 303 there is mounted an engine 317 having cylinders 317a inclined obliquely forward. On the pivot section 304 of the main frames 303, the front end of a rear fork 318 is rockingly supported. Then at the rear end of the rear fork 318 is rotatably supported a rear wheel 319. A numeral 320 refers to a rear suspension, and a numeral 321 a radiator, and a numeral 322 a muffler.

A handlebar 325, the head pipe 302 and their vicinity at the front of the vehicle body are covered from the front with an upper cowl 326. The engine 317 and an exhaust pipe extending therefrom are covered with an under cowl 328. Further the seat rail 307 and its vicinity are covered with a seat cowl 330. These fairings 326, 328 and 330 are continuously connected with one another in a so-called full covered type.

The engine 317 is supported at the front on right and left engine hangers 331 extending downward from the vicinity of a connection between the main frames 303 and the head pipe 302, and at the rear of the cylinder 317a on a hanger plate 332 extending from the main frames 303, and also at the rear of the engine on the main frames 303, and finally secured to the frame 301. The rear suspension 320 is substantially formed as a part of the frame 301 with its strength serving as a part of that of the frame 301.

With an intake port of the cylinder 317a of the engine 317, an intake passage 336 in which a carburetor 335 is inserted is connected, extending obliquely upwardly toward the rear. The top end of this intake passage 336 is connected to the air cleaner 315. An air introducing duct 337 is installed to the front part of the air cleaner 315, extending forwardly with its downward curved end opening at the rear of the head pipe 302

Next, the construction of the intake structure near the opening of the air introducing duct 337 will be explained in detail by referring to FIGS. 18 to 22. There is installed a connecting pipe 340 with its both ends welded between the lower part of the head pipe 302 and a point slightly below the connection between the engine hanger 331 and the main frame 303. Accordingly between the head pipe 302, the main frame 303 and the engine hanger 331 and the connecting pipe 34 is formed an opening 341 enclosed with these members. The opening 341 is used as an air inlet port to lead the air to a space at the rear of the head pipe where the opening of the duct 337 is situated. On the connection between the main pipes 303 and the engine hanger 331, a reinforcing gusset plate 345 is attached by welding. This gusset plate 345 also is provided with an opening 346 for introducing the air.

Between the engine 317 and the air cleaner 315 a rubber sheet 350 produced of a flexible material is installed with both the right and left ends connected to the connecting pipe 340, the gusset plate 345 and the main frame 303. Therefore the front part of the air cleaner 315 and the air introducing duct 337 is shielded from the engine 317. The rubber sheet 350, as shown in FIG. 20, is retained by inserting and bending the end of a clip 352 extending from the gusset plate 351 disposed astride the right and left connecting pipes 340, in a hole 350a formed at the front of the sheet. And further, as shown in FIG. 22, the sheet 50 is installed to the frame 301 with a stud 353 with an expanded head 353a extending from the main frames 313 inserted in a hole 350b formed in the rear part. To a cross member 355 installed at the front between the right and left main frames 303, a wide stay 356 produced of a resin material extending obliquely forward is attached by clamping with lugs 357 formed integral with the stay. At the forward end of the stay 356, a hook section 359 is formed and inserted in a locking hole 350c made nearly at the center of the rubber sheet 350, thereby holding the rubber sheet 350 firmly in the vicinity of a part opposite to the opening of the air introducing duct 337. On the upper surface of the stay 356 a coupler holder 361 is formed in one body, retaining a coupler 362 for connecting electrical cables.

In the two-wheeled motorcycle of the above-described constitution, the rubber sheet 350 is installed between the air cleaner 315 and the air introducing duct 337 extending forward therefrom and the engine 317, thereby protecting the air cleaner and other equipment from radiation heat and hot air from the engine 317 and also preventing the hot air from the engine 317 from entering the air cleaner 315 directly through the air introducing duct 337. Thus enhanced intake efficiency can be obtained.

The rubber sheet 350 is retained by the stay 356 extending from the vehicle frame 301 at the part opposite to the opening of the air introducing duct, and therefore no displacement of the rubber sheet section will occur at a part corresponding to the opening even when the intake negative pressure of the engine 317 acts on the opening of the air introducing duct 337.

In addition, the stay 356 is formed integral with the coupler holder 361. The adoption of this integrated structure can decrease the number of parts as compared with the use of the stay produced separately from the coupler holder, and can restrict free movement of cables, the life of which, therefore, can be prolonged.

The fuel tank 312 of the above-described embodiment practically functions to reserve fuel. This structure, however, is applicable to two-wheeled motorcycles using a dummy tank, but it is to be understood that it is applicable not only to the two-wheeled motorcycles but also to three-wheeled motorcycles.

Thus, because the rubber sheet is not movably retained by a stay extending from the vehicle body at a part corresponding to the opening of the air introducing duct, the rubber sheet will not be subjected to displacement if the intake negative pressure of the engine acts the sheet through the opening of the air introducing duct, and besides the surface area of the intake air opening will never be changed, thereby enabling the prevention of noise likely to be caused by the flaps of the rubber sheet.

While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A front fender mounting structure for mounting a front fender, extending along and displaced from a front wheel and extending transversely across the front wheel, to a front fork of a vehicle, comprising side plate sections on the front fender having first mounting holes in said side plate sections, said side plate sections including a retainer adjacent the inner end of each said first mounting hole, each said retainer having plate-like resilient nail pieces extending integrally inwardly of said side plate sections between the inner surface of the upper portion of the front fender and the inner surface of said side plate section;

brackets on the front fork adjacent said side plate sections and including first bracket holes aligned with said first mounting holes in said side plate sections;

a nut associated with each said first mounting hole, resiliently positioned in an adjacent said retainer between said resilient nail pieces;

fasteners extending through said first bracket holes, said first mounting holes and said nuts.

2. The front fender mounting structure of claim 1 wherein said brackets further includes second bracket holes on the opposite side of the front fork from said first bracket holes, said side plate sections further have second mounting holes aligned with said second bracket holes.

* * * * *